United States Patent [19]

Barnett et al.

[11] Patent Number: 5,912,773
[45] Date of Patent: Jun. 15, 1999

[54] APPARATUS FOR SPATIAL LIGHT MODULATOR REGISTRATION AND RETENTION

[75] Inventors: Jeffrey Lynn Barnett, Garland; Danny Lee Pyles, Plano, both of Tex.

[73] Assignee: Texas Instruments Incorporated, Dallas, Tex.

[21] Appl. No.: 09/039,610

[22] Filed: Mar. 16, 1998

Related U.S. Application Data

[60] Provisional application No. 60/043,614, Mar. 21, 1997.

[51] Int. Cl.$^6$ .................................................. G02B 7/02
[52] U.S. Cl. ........................ 359/822; 359/819; 359/298; 359/280
[58] Field of Search ........................ 359/819, 822, 359/823, 290, 298, 280, 281

[56] References Cited

U.S. PATENT DOCUMENTS

| | | | |
|---|---|---|---|
| 4,088,396 | 5/1978 | Edelatein | 359/822 |
| 5,136,433 | 8/1992 | Durell | 359/819 |
| 5,138,496 | 8/1992 | Pong | 359/822 |
| 5,386,313 | 1/1995 | Szegedi et al. | 359/280 |
| 5,508,851 | 4/1996 | Tachizawa | 359/822 |
| 5,737,132 | 4/1998 | Luecke et al. | 359/819 |

*Primary Examiner*—Loha Ben
*Attorney, Agent, or Firm*—Charles A. Brill; Frederick J. Telecky, Jr.; Richard L. Donaldson

[57] ABSTRACT

A method and apparatus for adjusting spatial light modulators in an imaging system. The apparatus includes several screws, plungers and pins connecting to a housing. When the screws and plungers are adjusted, the device held by the housing is manipulated along the x, y and z axes, allowing the device to be focused and aligned. If multiple modulators are involved, they can also be converged. The method includes the steps of mounting the devices in adjustable sockets, aligning each device, focusing each device and then positioning images from each device to converge with images from other devices.

9 Claims, 2 Drawing Sheets

APPARATUS FOR SPATIAL LIGHT MODULATOR REGISTRATION AND RETENTION

This application claims priority under 35 U.S.C. §119(c)(1) of provisional application Ser. No. 60/043,614, filed on Mar. 21, 1997.

BACKGROUND OF THE INVENTION

1. Field of the Invention

This invention relates to spatial light modulator imaging systems, more particularly to those systems requiring alignment of at least one spatial light modulator in an optical path.

2. Background of the Invention

Spatial light modulators come in many forms, including those that can be used to create images. One type of these image-forming modulators are spatial light modulator arrays, typically consisting of an array of individually controllable elements, their corresponding control circuitry, and drive electronics for accessing the control circuitry. Common example of these types of modulators are liquid crystal devices (LCDs), Actuated Mirror Arrays (AMA™) manufactured by Daewoo, and Digital Micromirror Devices (DMD™) manufactured by Texas Instruments.

These devices reflect or transmit incident light in a grid of dots, called picture elements or pixels. The amount of time an element is in a given state, either ON or OFF, determines the intensity of each pixel. The pixels form the image being created by the device. With just white light and non-colored elements on the device, the image appears as black and white. This would be used in monochrome display systems, or even in printing systems, where the color is formed by the use of colored toners, not the white.

Color display images can be formed in several ways. One method is to actually color the pixels themselves so that the incident light being reflected or transmitted becomes that color. Another is to use one device and either color filters, or colored light sources, where the color being imaged onto the projection surface is achieved by changing the color of the light. Yet another method is to use three devices, one for each of the additive primary colors, red, green, and blue. The latter two methods rely upon the integration of the human eye to take three "layered" images, one for each color and convert it to an image of one color.

Additionally, using either the one chip and color filter system, or the three chip system, the alignment of the device or devices in the appropriate optical path to register and focus the pixels on the display surface is critical. For example, in a three device system each device receives and reflects or transmits one color. The pixels projected from each device must exactly line up with the corresponding pixels from the other device, or the pixels will have colored edges and the picture will be blurry and oddly colored. In the one device example, the device must be situated in the proper position for the image formed by the modulator to be in focus.

Both of these problems must be solved in a manner that is easy to perform and permanent. Once the images are aligned, or registered, the devices must be locked into position. Therefore, a method and apparatus is needed that allows the alignment of spatial light modulators and holds the aligned position.

SUMMARY OF THE INVENTION

One aspect of the invention is a 6-axis adjustable socket to focus and align at least one spatial light modulator in an imaging system. The socket has a combination of screws, plungers and springs that allow it to be moved in two directions each for the x, y, and z axes. The socket is an integral part of the mounting of the device in the imaging subsystem, such that after the device is aligned and locked into place, the alignment is maintained when the device is inserted into the subsystem.

A second aspect of the invention is a method for aligning the device or devices using adjustable sockets. The alignment can be done to focus a single device system, or to focus and perform color convergence on a multiple device system. The device or devices are mounted into the sockets, with one socket per device, the sockets are attached to the imaging subsystem and the entire subassembly is connected to drive electronics in a test chamber. A series of patterns are projected into the lenses of cameras and the screws on the socket are adjusted until all devices are focused and converged, if the system has more than one device. When the correct position is achieved, the socket adjustments are fixed into place and the subassembly inserted into the imaging system engine.

It is an advantage of the invention in that it allows proper focus and alignment of spatial light modulator devices in imaging systems.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

In spatial light modulator imaging systems, the image is typically created from at least one array of individually controlled elements, each corresponding to a picture element (pixel) or dot on the viewed image. The viewed image could be that projected up onto the screen, or projected onto a photosensitive surface and converted into a static image, such as a printed image. For discussion purposes only, the images here will be limited to those created for a display system.

In the display systems using these devices, there can be several different configurations based upon the number of devices used. Some systems use one device and some method of changing the color of the light to achieve the standard red, green and blue color mix. Some systems use two devices, using one device for two colors and one device for the third. Other systems use three devices, one for each color.

Regardless of how many devices are used for which colors, each system using the devices must ensure that the devices are properly positioned with respect to the imaging optics and the light source. For multiple spatial light modulator (SLM) systems, where a different device is used for at least one color, the color projections must be aligned properly.

Color systems using more than one device achieve the proper mix of red, green and blue by "layering" pixels from corresponding positions on the different devices onto the same spot on the projection surface. If the alignment is not correct, these pixels will have an edge of one color and an edge of another. For example, assume three devices were used, and the first element in the first row of each device were being layered onto the same spot on the screen. If the red device projected its pixel slightly to one side of the desired position, that pixel would appear to have a red edge. This problem would be reflected across the whole device. In order for proper alignment to be maintained, the devices must be aligned along the x, y and z axes.

While it would appear that this type of adjustment is only applicable to the multiple SLM systems, it can be used for single SLM systems. In addition to the image being adjusted to match the other devices positions, a problem that does not affect single SLM systems, the SLM must be adjusted to lie within the image plane of the projection optics. If the SLM position is not correct, the resulting image is out of focus.

Figure 1:
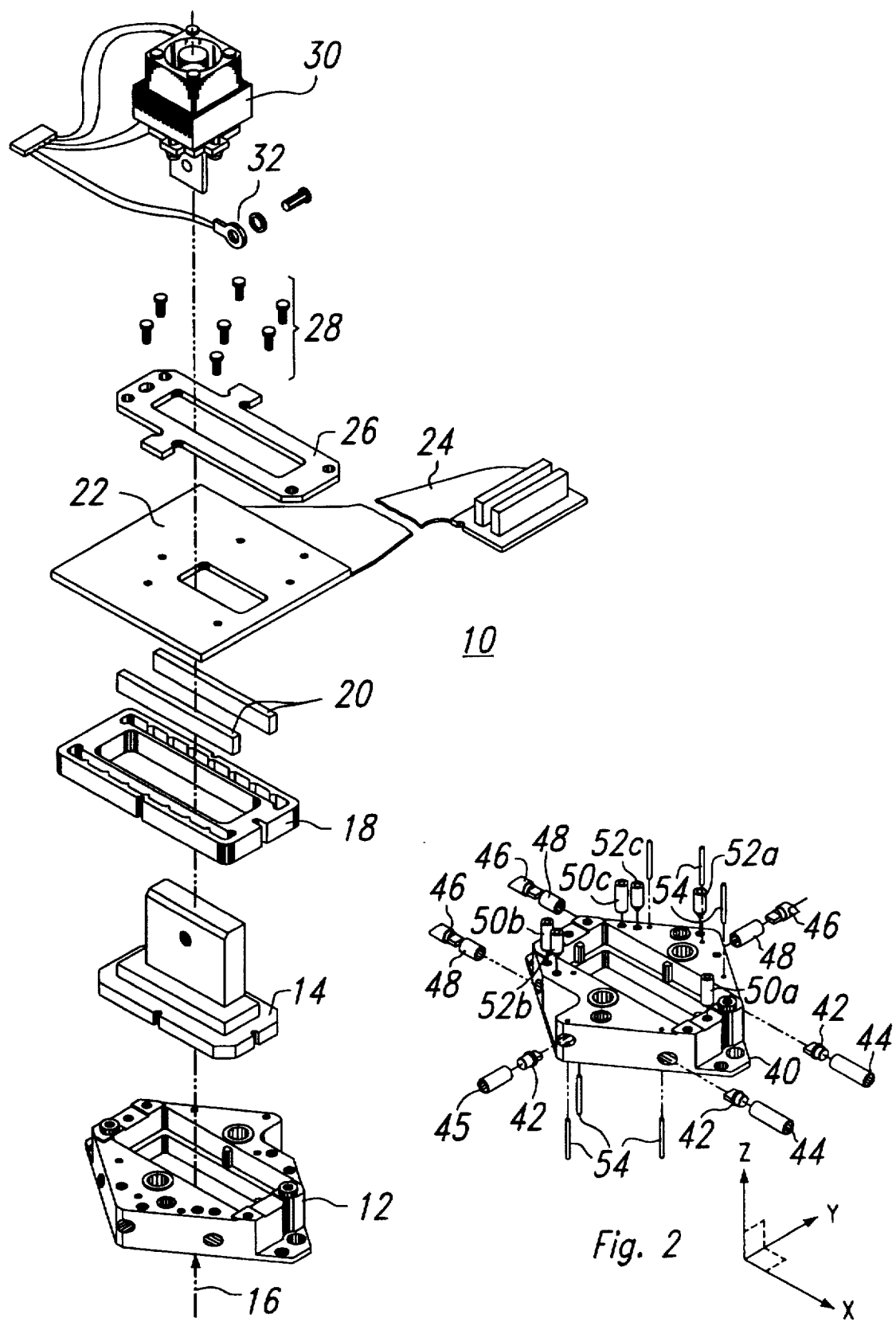
FIG. 1 shows an adjustable position modulator subassembly for an imaging system without any optics attached.

An adjustable position socket subassembly is shown in FIG. 1. The term "subassembly" is used to refer to parts of the entire imaging system. The entire system would be the "assembly." That which is shown in FIG. 1 is more than just the socket, it also includes the SLM and the connections to drive electronics to operate the SLM.

The subassembly 10 is shown in a downward facing attitude. Light would enter the subassembly in the direction of arrow 16, through the socket 12 and strike the surface of the SLM 14. However, the components of the adjustable position socket assembly are more readily apparent when it is shown in this position.

The SLM 14 is mounted into the 6-axis adjustable socket 12. The 6 axes are rotation and translation in the x direction, rotation and translation in the y direction, and rotation and translation in the z direction. In other embodiments, it may not be necessary to have adjustment in 6 axes. In those cases, a three axes adjustable socket could be used, where the axes would be rotation around the x and y axes, and translation along the z axis.

A connector holder 18 and connectors 20 are positioned to hold the socket 12 and connect the SLM 14 to the plate 22. Plate 22 has the appropriate connections to send and receive data from the cable 24. Cable 24 is used to communicate between the imaging system controller and the SLM, determining what images are produced by the SLM. Plate 26 and screws 28 secure the various pieces.

The connector 20 can be used to make electrical connections as well as contribute to the mechanical integrity of the socket assembly. In a preferred embodiment, these connectors are layers of an elastomer and a conductive material, allowing them to complete electrical connections.

Cooling assembly 30 inserts into the openings of holder 18, plate 22 and plate 26 in order to keep the SLM cool during operation. The cooling assembly shown here is a thermoelectric cooler (TEC), which is a powered device. Therefore, it has power connection 34 and temperature sensor 32. Other options for the cooling assembly could be a heat sink or liquid cooling, such as through a conduit passed next to the assembly.

During alignment, image data is received from the imaging system along cable 24 and transmitted to the SLM 14. This data results in an image being projected into a camera, which is used to focus the image, and to adjust the position of the colors, if necessary. The adjustments are made by adjusting a series of screws, plungers and springs on the socket 12. This socket is shown in more detail in FIG. 2.

The socket housing 40 contains several holes to accommodate the varying adjustment controls. Two different type of adjustment controls are used. The first type is for focus, which can be seen by adjustment screws 50a, 50b and 50c. The adjustment of these screws affects the sharpness of the image projected by each SLM. In single chip systems, they will typically be the only screws adjusted.

The second type of adjustment controls are for color convergence. The conical shape on the modified screws 52a, 52b and 52c, allow pressure exerted by them to move the plungers 42 and 46 in and out, since the plunger/spring combination comes into contact with the conical end of the screw. The springs 44 and 48 are held into place from the top surface of the housing 40, by pins 54.

Adjustment screw 52a is for vertical convergence between the images projected by the three SLM system. Adjustment screws 52b and 52c are for horizontal convergence.

In this way, an adjustable position socket is created that can adjust along 6 axes for proper device alignment. After the various screws, plungers, springs and pins are in place, this socket would then be made part of the adjustable position socket assembly of FIG. 1.

After the entire assembly is completed, it is used to align the device or devices of an imaging system. As discussed previously, the discussion here will be limited to display imaging systems, with the understanding that it would apply to other types of imaging systems as well.

Figure 2:
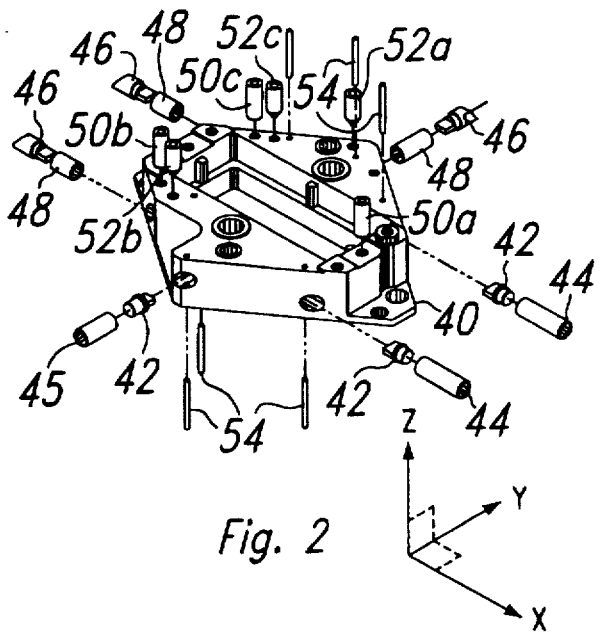
FIG. 2 shows an adjustable position socket for a spatial light modulator device.
Figure 3:
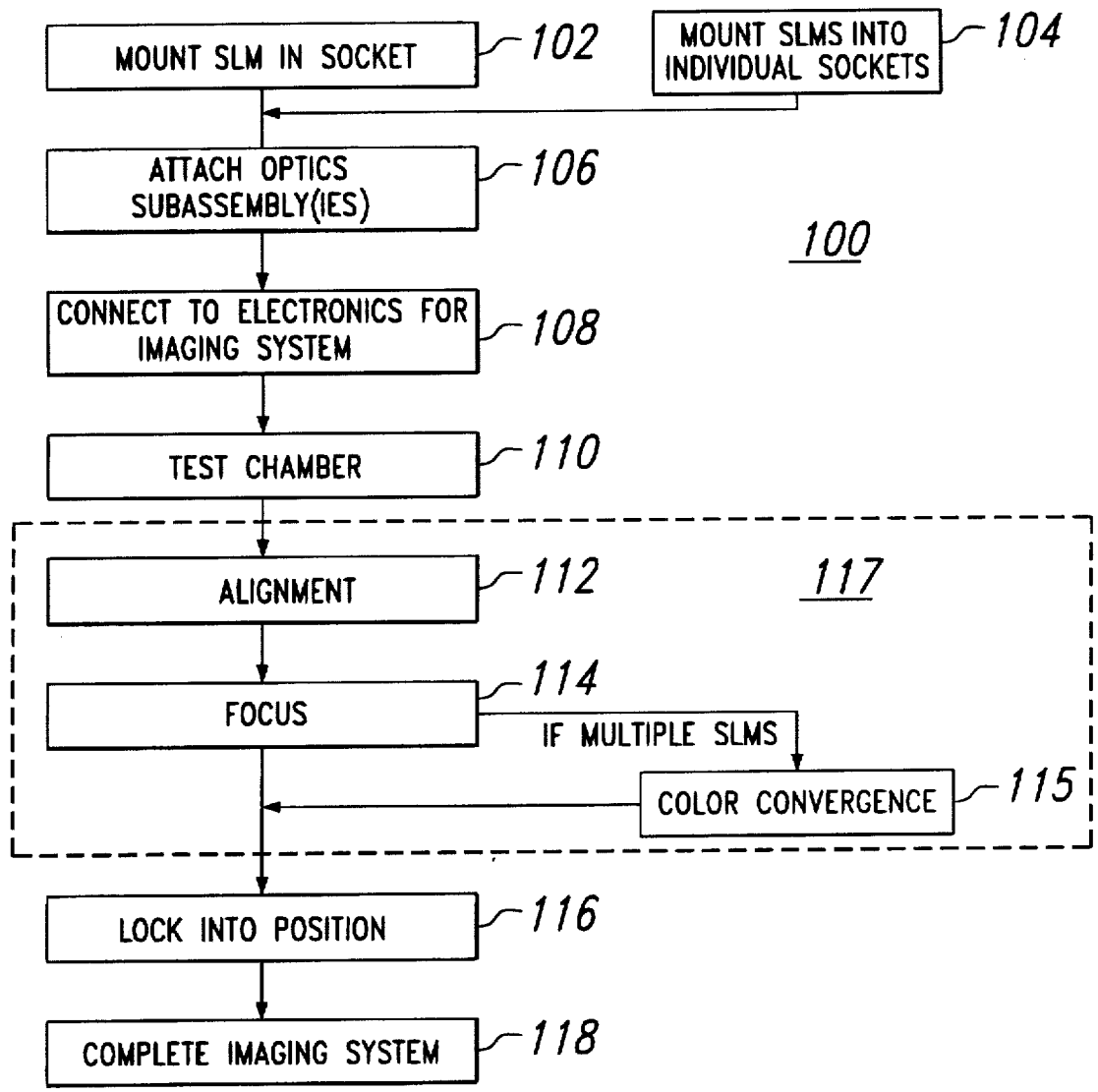
FIG. 3 shows a flowchart for a procedure to align and converge spatial light modulators in an imaging system.

The assembly is used in an alignment and focusing process such as the one shown in FIG. 3. The process 100 takes into account use in either a single SLM system or a multiple SLM. The SLM is mounted in the socket at step 102. If there are multiple SLMs, they are all mounted into their individual sockets and socket assemblies such as those shown in FIGS. 1 and 2. Notice that the socket assembly of FIG. 1 assumes a reflective spatial light modulator, where the light enters and exits the light at an angle to one surface of the device, such as is shown by arrow 16 in FIG. 1. However, the adjustment socket itself and the assembly could be used in other systems with transmissive SLMS, such as LCDs.

The combination of the socket subassembly and the optics subassembly will be referred to as the test subassembly. The test subassembly is connected to the electronics of the test chamber or of the actual imaging engine itself in step 108. The decision of connecting to a separate system for test or using the electronics in the imaging system for test is left up to the designer. Either way, test patterns must be received through the cable shown in FIG. 1 for operation of the device. The test chamber is then energized in step 110.

After activating the test chamber, the device or devices are run through several test patterns in the adjustment portion of the test procedure 111. For a multiple or a single SLM system, the device must be aligned in step 112. This is done by projecting a test pattern from each device onto a test pattern for alignment. One example of such a test pattern would be a cross. The various adjustment screws on the socket of FIG. 2 are then adjusted until the image for that system or for that color is aligned. This is repeated until all of the colors are aligned according to the grid or alignment marks.

An optional step between the alignment step 112 and the focus step 114 would be to check other parts of the optics subassembly. This could eliminate some blemishes or debris on such parts of the optics assembly as lenses, integrators and the spatial light modulators. These types of errors would not be alignment errors but dark spot errors in the test images.

At step 114, the various spatial light modulators are focused. The socket is adjusted relative to the optics subassembly first, and then the socket itself is adjusted in position. First the screws that move the socket relative to the optics subassembly interface (such as a prism) are moved to bring the socket flush with the optics subassembly interface. The image is first adjusted by using the projection lens focus adjustment to focus the test pattern. A suitable test pattern for this adjustment could be a grid.

The optics subassembly is then rotated to put the image out of focus. The focus screws on the socket are then used to bring the image into focus. If this is a multiple SLM system, this step is repeated until all of the SLMs are focused. Focus is performed by adjusting the screws 50a, 50b, and 50c, as shown in FIG. 2.

If the system uses multiple SLMs, the process must then go to step 115, color convergence. This ensures that all of the pixels from each device are overlaying each other properly. This can be done in several ways and depends upon whether there are two SLMs or three. The following discussion will assume that there are three SLMs, one each for red, green and blue, with the understanding that it could be applicable to two SLM systems as well.

One color must be designated as the reference color. For the purposes of this example, red will be the reference color. The device for red and the device for green are activated with a test pattern. The socket for the green device is adjusted to move the green image onto the red image. Once the green image is aligned, the green image is turned off and the blue image is projected with the red. The blue image is then adjusted to fit the red image. Finally, all three images are displayed and convergence is verified.

Once the SLMs are aligned, focused and converged, brackets holding the socket are soldered into place and the devices and their subassemblies are allowed to cool. Once cool, the images are rechecked and minor adjustments, if any are made. The sockets are then fastened to the board with retaining clips and adhesive. When the adhesive is cured, the cooling assembly shown in FIG. 1 is attached to complete the subassembly.

Finally, when all of the devices are aligned, focused, converged and fastened into place, and the cooling assembly is attached, the subassembly is inserted into the imaging system chassis and the system completed with the necessary projection optics, control panels, etc.

The resulting system has aligned, focused, and if necessary, converged SLMs for high quality image projection. The system maintains its high quality through the locking down of the adjustment controls in such a manner as is described above that is resistant to vibration and other variable that could affect the quality of the final image.

Thus, although there has been described to this point a particular embodiment for a method and structure for adjustment of spatial light modulators in imaging systems, it is not intended that such specific references be considered as limitations upon the scope of this invention except in-so-far as set forth in the following claims.

What is claimed is:

1. A mounting assembly for an image projection device, comprising:
   a. an adjustable-position socket, wherein said socket has a cavity;
   b. a spatial light modulator assembly that is operable to be inserted into said cavity;
   c. a holder operable to hold said spatial light modulator assembly in said socket, wherein said holder includes connectors on a surface of said holder, opposite a surface of said holder that contacts said spatial light modulator assembly;
   d. a connector plate in contact with said connectors, wherein said connector plate includes a cable for connection to an imaging system;
   e. a mounting bracket in contact with said connector plate, wherein said contact is made on a surface opposite a surface in contact with said connectors; and
   f. a cooling assembly mounted on said mounting bracket.

2. The mounting assembly of claim 1, wherein said socket can be adjusted on six axes.

3. The mounting assembly of claim 1, wherein said socket can be adjusted on three axes.

4. The mounting assembly of claim 1, wherein said spatial light modulator is a digital micromirror device.

5. The mounting assembly of claim 1, wherein said spatial light modulator is a liquid crystal device.

6. The mounting assembly of claim 1, wherein said cooling assembly further comprises a thermoelectric cooler.

7. The mounting assembly of claim 1, wherein said cooling assembly further comprises a heat sink.

8. The mounting assembly of claim 1, wherein said cooling assembly further comprises a liquid cooling system.

9. The mounting assembly of claim 1, wherein said connectors included in said holder comprise elastomer and conductive materials operable to make electrical connections.

* * * * *